United States Patent Office 3,426,226
Patented Feb. 4, 1969

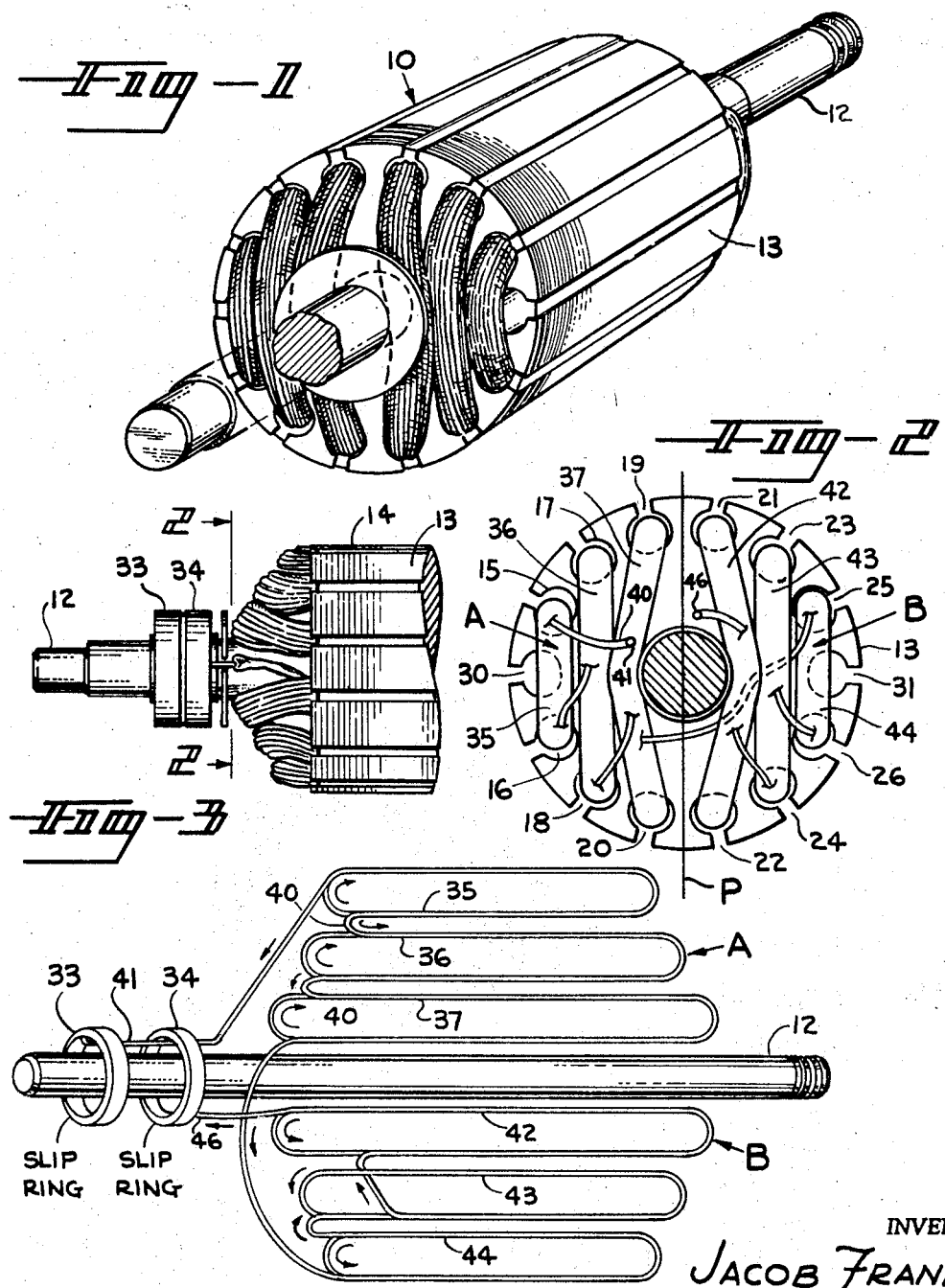

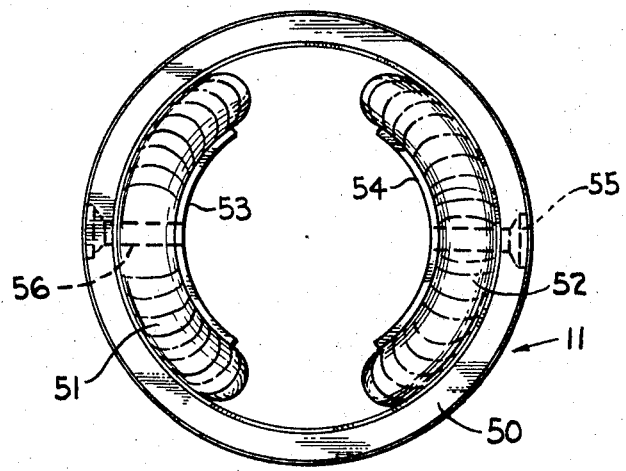
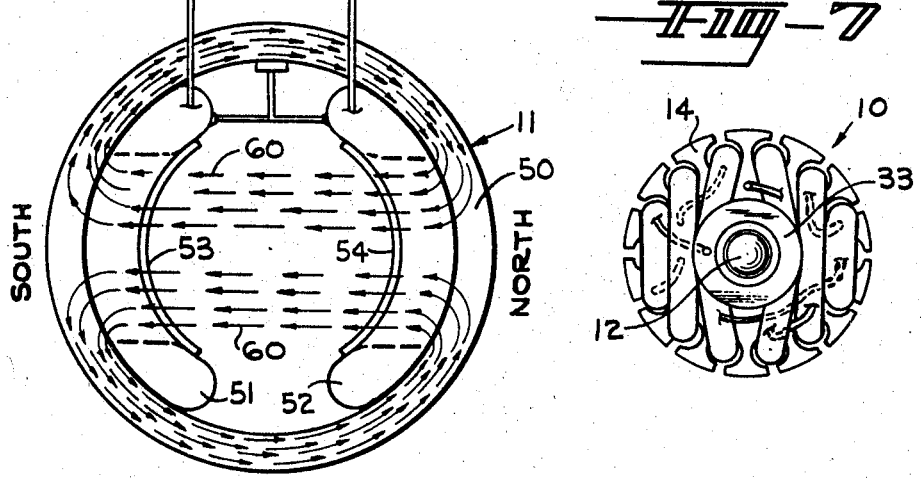

3,426,226
DYNAMOELECTRIC MACHINE WITH ROTATING ARMATURE HAVING PARTIALLY DISTRIBUTED SPIRAL WINDINGS
Jacob Frank, 400 Rock Lake Drive, Orlando, Fla. 32805
Filed July 21, 1966, Ser. No. 569,791
U.S. Cl. 310—162    4 Claims
Int. Cl. H02k *19/00, 1/24, 3/04*

The present invention relates to a dynamoelectric machine and is particularly suitable for portable generators for providing 110 v. AC and higher, although the invention could be embodied in other forms of generators.

Heretofore it has been the practice to provide magnetomotive force producing elements on armatures of generators or the like by winding wire in the form of coils lying in slots in the peripheries of the armatures so that the coils overlap one another.

I have discovered that by providing two physically separated magneto-motive force producting elements on opposite sides of the armature which are series connected and subjecting the armature and elements to a single flux field which flows transversely of the axis of the armature, the current generated thereby has such sharp alteration of direction of induced current flow that as a result there are marked decreases in counter electromotive forces, residual reverse bias and harmonics and which produces a more uniform and desirable sine wave with unusual economy of parts and space.

In carrying out the invention, a generator having a single magnetic field between two diametrically opposed poles is provided with an armature rotatable between the poles and having wire wound in a plurality of coils having reaches extending longitudinally of the armature and on one side of a medial plane extending along and intersecting the axis of the armature and connected in series with like wire wound coils on the other side of the armature defined by the aforementioned medial plane, the wire in the coils on the opposite sides of the armature being wound in opposite directions. In the preferred form of the invention the coils on opposite sides of the armature each comprises a plurality of individual, series connected coils lying in planes parallel to the medial plane through the armature, and are disposed in slots extending longitudinally of the armature at the peripheral portions thereof.

Other objects and advantages of the invention will become apparent from the following description of a preferred form thereof, reference being made to the accompanying drawings wherein:

FIG. 1 is a perspective view of an armature of an alternating current generator embodying the invention;

FIG. 2 is a sectional view of one end of the armature taken substantially along line 2—2 of FIG. 3;

FIG. 3 is a fragmentary side elevational view of the armature;

FIG. 4 is a schematic view of the windings on the armature;

FIG. 5 is an end view of the stator of the generator;

FIG. 6 is a view similar to FIG. 5 showing the magnetic flux flow in the stator; and FIG. 7 is an end view of the armature.

Referring to the drawings, an armature 10 is shown wound according to the present invention and which is adapted to be mounted in a suitable frame, not shown, for rotating in a stator 11 to generate an alternating electric current. The frame and means for supporting, rotating the armature and collecting the current output are not shown as they may be of conventional form.

The armature 10 is comprised of an axial shaft 12 which carries a body 13 composed of laminated iron plates 14 secured together, as is customary in the art and the armature is cylindrical in form with the shaft 12 forming the axis thereof.

The peripheral portions of the armature 13 has twelve axially extending slots 15, 16, 17, 18, 19, 20, 21, 22, 23, 24, 25 and 26. A slot 30 is formed between slots 15, 16 and a slot 31 is formed between the slots 25, 26, and all of the slots are angularly spaced equally about the axis of the shaft 12 and are of like configuration. The transverse sectional form of the slots are similar to key holes, having a cylindrical section inwardly of the outer surface of the armature connected with the outer surface by relatively narrow slots. This form of slot is well known for retaining the coiled wire therein.

Two slip rings 33, 34 are attached to the shaft 12 and are insulated from the shaft and from one another as is conventional practice. It will be understood that the shaft 12 is journaled in suitable bearings in the frame of the generator and rotatively supports the armature concentric with the cylindrical stator 11. Brushes, not shown, ride on the slip rings 33, 34 to collect the generated current, as is common practice.

In accordance with the invention, two physically separated magneto-motive force producing elements A and B are formed on the armature on opposite sides of a medial plane, indicated at line P in FIG. 2, and are series connected.

The element A comprises coils 35, 36 and 37 which are formed by winding a wire 40 in slots 15, 16; 17, 18 and 19, 20, respectively. The wire 40 may be of any suitable size and is insulated as is common practice. One end 41 of the wire is connected to the ring 33 and is led to slot 15 and then wound in a coil in slots 15, 16 with the reaches in slot 15 extending rearwardly when the view of the armature 13 in FIG. 2 is considered the front end of the armature, and the wire in the reach of the coil in slot 16 extends forwardly. The wire 40 from a forward end turn of the coil 35 leads to the coil 36, and the wire from a forward turn of coil 36 leads to coil 37. The number of turns in each coil need not be the same; for example, coil 35 may consist of twenty-three turns. Coil 35 may have fewer turns than the other two coils because of the difficulty in bending the wire at the ends of the turns, which are of relatively short radius.

The element B is comprised of coils 42, 43, 44 formed by the wire 40 being wound in coils having their upper and lower reaches lying in the slots 21, 22; 23, 24 and 25, 26, respectively. The coils 42, 43, 44 are wound in the opposite direction to the winding of the coils 35, 36, 37, that is to say, the wire forming the upper reaches of the coils 42, 43, 44 extend forwardly, as viewed in FIG. 2, and the wire in the lower reaches extend rearwardly. The number of turns in coils 42, 43 is the same as the number of turns in coils 36, 37, and the number of turns in coil 44 is the same as that in coil 35. Thus, the coils in elements A and B are symmetrically arranged on the armature 13.

The end 46 of the wire 40 is connected to the slip ring 34 so that the elements A and B are series connected in the armature circuit.

It will be noted that the reaches of the respective coils in the elements A and B lie in planes parallel to the medial plane P.

Preferably, the coils are each embedded in a suitable plastic, poured into the slots about the coils and which sets up to insulate and retain the coils in place.

The slots 30, 31 have no wire therein and they are provided merely to balance the armature in weight and magnetic characteristics.

The stator 11 comprises a cylindrical iron shell 50 which has two magnetic coils 51, 52 secured therein by pole plates 53, 54 and screws 55, 56, as is conventional. The coils 51, 52 are energized from a suitable DC current source 57 so that a magnetic flux flow is established transversely of the armature, as indicated by the arrows 60 in FIG. 6.

As the armature 13 is rotated, the coils of the elements A and B cut the magnetic lines of force in a manner which produces a sharp reversal in direction of flow with a minimum of counter E.M.F., residual reverse bias and harmonics. Thus, maximum efficiency is obtained in the generation of AC current having a desirable sine wave.

Although but one form of the invention has been shown, it will be apparent that other forms, modifications, and adaptations thereof may be made, all falling within the scope of the claims which follow.

I claim:

1. In a dynamoelectric machine, a stator, an armature surrounded by said stator and rotatable relative thereto, means forming a single flux field with magnetic lines of force flowing transversely of said armature relative to the axis thereof, first coil means carried on said armature on one side of a medial axially extending plane thereof, said coil having the wire of opposite reaches thereof extending longitudinally of said armature, a second coil means carried by said armature on the opposite side of said medial plane, the wire of opposite reaches of said second coil extending longitudinally of said armature, and means connecting said first and second coil means in series so that the direction of current flow through the respective coils is in opposite directions.

2. In a dynamoelectric machine as defined in claim 1 further characterized by said first and second coil means each comprising a plurality of individually wound coils, the number of individual coils comprising each coil means being equal.

3. In a dynamoelectric machine as defined in claim 2 characterized by the individual coils each lying in a plane parallel to the planes of the other individual coils.

4. In a dynamoelectric machine as defined in claim 3 characterized by said respective individual coils of said first and second coil means being symmetrically positioned relative to said medial plane.

References Cited

UNITED STATES PATENTS

| | | | |
|---|---|---|---|
| 1,849,263 | 3/1932 | Apple | 310—180 X |
| 2,550,663 | 5/1951 | Bechberger et al. | 310—195 X |
| 2,885,645 | 5/1959 | Wennerberg | 310—261 X |

WARREN E. RAY, *Primary Examiner.*

U.S. Cl. X.R.

310—180, 202, 265